Patented Dec. 2, 1930

1,783,377

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF MAKING DISINFECTANT COMPOSITIONS

No Drawing. Application filed February 27, 1928. Serial No. 257,544.

This invention relates to an improvement in the process of making dust disinfectants containing mercury, and more specifically to a process for making dust disinfectants containing organic mercury compounds, in a one-step process.

Heretofore in making disinfectants containing organic mercury compounds, it has been the practice to first form organic mercury compounds, usually by a wet process, either in water or in an organic solvent, to isolate the organic mercury compound, and then to mix it with the necessary diluent to give a disinfectant of the desired composition and properties. These disinfectants, which are ordinarily obtained in dust form, can then be used as dusts, or they may be dissolved or suspended in water and used in that form for the treatment of seeds and plants.

This invention has as an object an improved process of making dust disinfectants containing a mercury compound. A further object of my invention is a method of producing dust disinfectants containing mercury compounds by a one-step process. Other objects will appear as the description proceeds.

I have discovered a new process for the manufacture of disinfectants, in dust form, containing alkyl or aryl mercury salts by which I can obtain a finished disinfectant in dust form in a one-step process, thereby eliminating much of the expense of previously known processes, and at the same time avoiding the necessity for handling these toxic aryl or alkyl mercury salts in concentrated form.

The following examples are given as specific embodiments of my invention but it will be understood that these examples are for illustrative purposes only and are not to be taken in any way as a limitation of my invention.

Example I 32 parts of tetra ethyl lead are intimately mixed with 930 parts of tolanite (a special clay) and 63 parts of mercuric acetate. After thorough mixing, which may require up to 24 hours depending upon the efficiency of the mill and the temperature at which the contents are held, the finely divided dry product, which then contains ethyl mercuric acetate, uniformly distributed through the insoluble diluent, is ready for use as a disinfectant. It may be suspended in water and used for the wet treatment of the material to be disinfected, or it may be dusted for example on seeds for the control of seed borne diseases.

Example II 29 parts of tetra ethyl lead are intimately mixed with 292 parts of sodium sulfate and 50 parts of mercuric chloride. There is thus obtained a dusty product which contains ethyl mercuric chloride in the presence of soluble diluents, and which is ready for use as a disinfectant particularly adapted for the control of seed and plant diseases.

Example III 51 parts of tetra methyl lead are mixed with 707 parts of infusorial earth and 152 parts of mercuric chloride. Heat is applied during the mixing to maintain a temperature of approximately 50° C., thereby reducing the time required for complete reaction. When the reaction is finished, the dry powder is discharged from the mixer and is ready for use as a seed disinfectant.

Example IV 64 parts of triethyl lead chloride are intimately mixed with 778 parts of finely divided clay and 158 parts of mercuric chloride. After the completion of the reaction, 10 parts of hydrated lime are added and uniformly mixed with the compound. The resulting dry powdered product is then discharged from the mixer and is ready for use as a disinfectant.

Example V 10 parts of tetra phenyl lead are mixed with 20 parts of mercuric acetate and 970 parts of infusorial earth, holding the temperature at 70° C. during mixing.

Example VI 6 parts of tetra ethyl tin are intimately mixed with 25 parts of mercuric chloride and 969 parts of calcium sulfate.

In place of the tetra ethyl lead, tetra methyl lead, and triethyl lead chloride, shown above, I may use any of the alkyl or aryl derivatives of metals that occur above mercury in the electromotive series, and particularly those that occur above hydrogen. I may also use compound such for example as the phenyl, methyl, ethyl, etc., derivatives of such metals as tin, bismuth, zinc, magnesium, etc. I have found the alkyl derivatives of lead, such as tetra methyl or tetra ethyl lead particularly well suited to my purpose.

It is obvious that the proportions may be varied widely without departing from the spirit of my invention. I may also use other disinfectants in the same combinations, employing my improved process. It is also obvious that the concentration of the active mercury compound may be varied within wide limits. I may, for example, prepare the mercury compounds free from diluents by this process, although I ordinarily prefer to have one or more finely divided solid diluents in the combinations, and I ordinarily find combinations containing only a small percentage of the mercury compound best adapted for use with seeds and plants.

Where, in the claims, I use the term "alphyl derivative" I wish to be understood as covering both the alkyl and aryl derivatives.

I claim:

1. A process of making dust-like disinfectant compositions containing mercury, which comprises effecting a reaction by intimate contact between a mercuric salt and an alphyl derivative of a metal that occurs above mercury in the electromotive series, in the absence of a liquid diluent.

2. A process of making dust-like disinfectant compositions containing mercury, which comprises effecting a reaction by intimate contact between a mercuric salt and a tetra alphyl derivative of a tetra valent metal lying above hydrogen in the electromotive series, in the absence of a liquid diluent.

3. A process of making dust-like disinfectant compositions containing mercury, which comprises effecting a reaction by intimate contact between a mercuric salt and an alphyl derivative of tetra valent lead, in the absence of a liquid diluent.

4. A process of making dust-like disinfectant compositions containing mercury, which comprises effecting a reaction by intimate contact between a mercuric salt and an alkyl derivative of tetra valent lead, in the absence of a liquid diluent.

5. A process of making dust-like disinfectant compositions containing mercury, which comprises effecting a reaction by intimate contact between a mercuric salt and tetra ethyl lead, in the absence of a liquid diluent.

6. A process of making dust-like disinfectant compositions containing mercury, which comprises effecting a reaction by intimate contact between a mercuric salt and an alphyl derivative of a metal that occurs above mercury in the electromotive series, in the absence of a liquid diluent, and in the presence of a finely divided solid diluent.

7. A process of making dust-like disinfectant compositions containing mercury, which comprises effecting a reaction by intimate contact between a mercuric salt and a tetra alphyl derivative of a tetra valent metal lying above hydrogen in the electromotive series, in the absence of a liquid diluent, and in the presence of a finely divided solid diluent.

8. A process of making dust-like disinfectant compositions containing mercury, which comprises effecting a reaction by intimate contact between a mercuric salt and an alphyl derivative of tetra valent lead, in the absence of a liquid diluent, and in the presence of a finely divided solid diluent.

9. A process of making dust-like disinfectant compositions containing mercury, which comprises effecting a reaction by intimate contact between a mercuric salt and an alkyl derivative of tetra valent lead, in the absence of a liquid diluent, and in the presence of a finely divided solid diluent.

10. A process of making dust-like disinfectant compositions containing mercury, which comprises effecting a reaction by intimate contact between a mercuric salt and tetra ethyl lead, in the absence of a liquid diluent, and in the presence of a finely divided solid diluent.

11. A process of making dust-like disinfectant compositions containing mercury, which comprises effecting a reaction by intimate contact between a mercuric salt and an alphyl derivative of a metal that occurs above mercury in the electromotive series, in the presence of a finely divided solid diluent, under such conditions that the composition is obtained directly in dust form.

12. A process of making dust-like disinfectant compositions containing mercury, which comprises effecting a reaction by intimate contact between a mercuric salt and a tetra alphyl derivative of a tetra valent metal lying above hydrogen in the electromotive series, in the presence of a finely divided solid diluent, under such conditions that the composition is obtained directly in dust form.

13. A process of making dust-like disinfectant compositions containing mercury, which comprises effecting a reaction by intimate contact between a mercuric salt and an alphyl derivative of tetra valent lead, in the presence of a finely divided solid diluent, under such conditions that the composition is obtained directly in dust form.

14. A process of making dust-like disinfectant compositions containing mercury, which comprises effecting a reaction by intimate contact between a mercuric salt and an alkyl derivative of tetra valent lead, in the presence of a finely divided solid diluent, under such conditions that the composition is obtained directly in dust form.

15. A process of making dust-like disinfectant compositions containing mercury, which comprises effecting a reaction by intimate contact between a mercuric salt and tetra ethyl lead, in the presence of a finely divided solid diluent, under such conditions that the composition is obtained directly in dust form.

16. A process of making dust-like disinfectant compositions containing mercury, which comprises intimately mixing tetra ethyl lead with an amount of a mercuric salt, at least molecularly equivalent to the tetra ethyl lead, and in the presence of a finely divided solid diluent, under such conditions that the composition is obtained directly in dust form.

In testimony whereof, I affix my signature.
MAX ENGELMANN.